C. S. MERRILL.
DEVICE FOR CUTTING FRUIT.
APPLICATION FILED JULY 19, 1913.
1,115,001.
Patented Oct. 27, 1914.
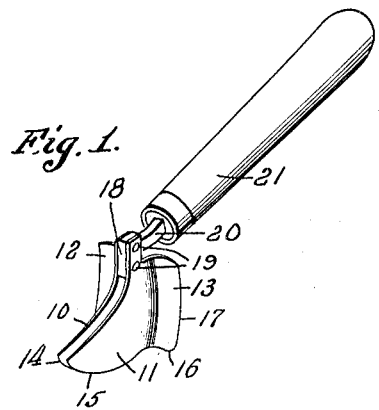
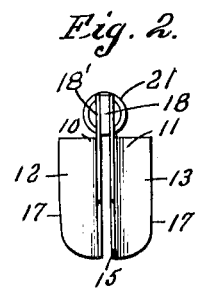
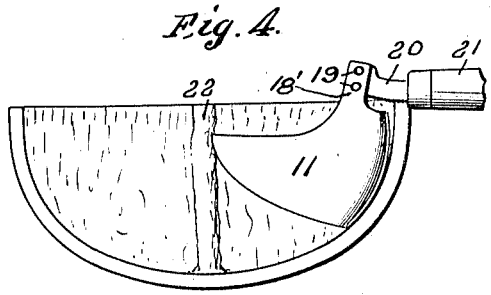
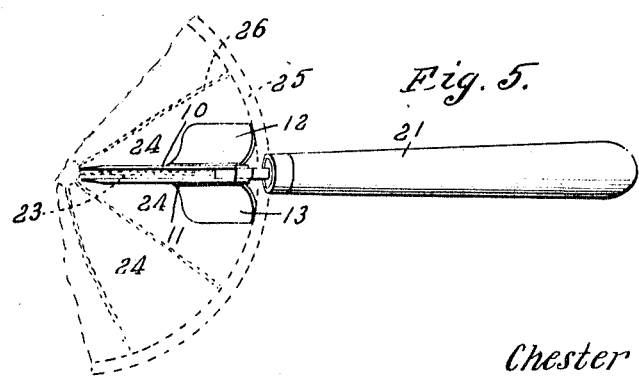
Inventor
Chester S. Merrill
Witnesses
By
Attorney

UNITED STATES PATENT OFFICE.

CHESTER S. MERRILL, OF BOSTON, MASSACHUSETTS.

DEVICE FOR CUTTING FRUIT.

1,115,001.  Specification of Letters Patent.  Patented Oct. 27, 1914.

Application filed July 19, 1913. Serial No. 779,982.

*To all whom it may concern:*

Be it known that I, CHESTER STANLEY MERRILL, a citizen of the United States, residing at Boston, in the county of Suffolk and State of Massachusetts, have invented certain new and useful Improvements in Devices for Cutting Fruit, of which the following is a specification.

This invention relates to devices for cutting fruits and vegetables, and more particularly for cutting fruits like grape-fruit, oranges, etc., where the fruit comprises an outer or covering rind inclosing pulp divided into cells or sections by membranous walls which are more or less tough and which are ordinarily in the form of partitions extending outwardly from a central core or axis to the inclosing rind. A common way of serving fruit of this description is to cut the grape-fruit or orange into halves on a plane normal to the axial core, the fruit pulp being scooped out of the rind when the fruit is eaten, this being generally accomplished by inserting a spoon just inside the cut edge of the rind and between the tough woody partitions defining the pulp cells or sections, and then forcing the spoon downwardly and inwardly in order to separate the meat from the rind at the rear and from the tough section walls on both sides. As the meat or pulp usually clings tenaciously to the rind and section walls, the separation can seldom be effected at all readily in the manner described; and in any case a clean separation of pulp from the woody portion of the fruit is practically out of the question. In order to facilitate the separation, the cut face of the halved fruit is sometimes cut or scored radially with an ordinary knife to effect a rough separation of the pulp from the section walls, and the knife is also usually passed around the outer ends of the sections just inside of and parallel to the rind to partially sever the pulp from the rind, the connection of the radial partitions to the rind being also severed, in part at least, by this last operation. Expedients such as this render it somewhat easier to eat fruit of this character, but they are unsatisfactory and troublesome at best; and they have the further disadvantage of mutilating the fruit to a considerable extent and thereby rendering it less attractive and appetizing in appearance.

A principal object of the present invention is to provide simple means whereby the edible portions of fruit like grape-fruit and oranges, may be readily and cleanly separated or severed to the desired extent from the radial membranous walls defining the fruit cells or sections, this separation being best effected simultaneously on both sides of a wall.

A further object is to provide means for effecting in addition a more or less complete separation of the pulp from the rind or core, or both.

Still another object of the invention is to provide a device capable of carrying out the operations mentioned while leaving the woody or membranous skeleton of the fruit, that is, the rind and radial cell walls, substantially intact, thus preserving the attractive appearance of the fruit and at the same time greatly facilitating the subsequent removal of the fruit pulp with a spoon.

Other objects of the invention will appear more fully in the following description and claims.

The device of the present invention comprises essentially two parallel blades or cutting members so mounted or held that they are spaced apart a relatively small distance, the extent of this spacing being preferably just sufficient to enable the twin blades to pass easily one on each side of the wall or membrane dividing the cells and as closely thereto as possible in order to shave the wall on both sides free of the fruit pulp. This arrangement of parts in a device of this character I believe to be broadly novel. Since it is also desirable to effect a separation of the pulp from the rind, I find it advantageous to combine with the twin blades just described, means for giving a cut or cuts transverse to the direction of the parallel blades; and in an embodiment of the invention which I have found to work particularly well, I provide such means in the form of cutting blades extending transversely to and outwardly in opposite directions from the parallel blades, each transverse blade being conveniently integral with the corresponding blade of the parallel pair, thus constituting simply extensions thereof. If desired however, the means for thus separating the pulp from the rind may be a structurally separate part or parts movable relatively to the parallel twin blades, although the integral construction described is much simpler and is thoroughly satisfactory. Where the transverse cutting means are integral with the parallel twin blades designed to work astride or on both sides of the cell-dividing membranes, it is apparent that each of the two members going to make up the cutting portion of the device comprises a blade arranged to work closely parallel to the face of a radial cell wall in combination with another cutting extension or blade extending in a generally transverse direction and approximately at right angles to the first blade. Obviously the separate compound cutting member thus composed might, when provided with a suitable handle or other mounting means, be used by itself for effecting separation of the pulp from one side of each cell wall and from the rind. In order to employ the separate members in this way however it would be necessary or most convenient to provide the separate cutters in sets of two, that is, a right hand and a left hand cutter, in order to conveniently operate on both sides of each cell wall.

In the accompanying drawings I have shown a typical embodiment of the present invention which I have found to be particularly useful in practice.

In the drawings,—Figure 1 is a view of the cutter in perspective; Fig. 2 is a front view in elevation; Figs. 3 and 4 are side elevations illustrating diagrammatically the method of using the cutter; and Fig. 5 is a plan view of the cutter in a position corresponding to that shown in Fig. 4.

Referring to the drawings, the cutting portion of the device comprises two similar right and left hand blades 10 and 11 having at their rear portions divergent lateral wings or extensions 12 and 13 respectively, each of which in this instance is integral with its respective blade. The opposite ends of the blades are advantageously pointed as indicated at 14. Each blade has a curved lower cutting edge 15 with which lower cutting edge 16 of the corresponding rear wing may be continuous in the same general surface of curvature. The vertically extending edge 17 of each wing may also be a cutting edge as shown. The rear portions of the blades are arcuate or curved to conform more or less approximately to the inner surface of the rind of the fruit for which the cutter is designed to be used; and to the same end the oppositely extending wings are also curved longitudinally, that is, in an up and down direction, to parallel said rear portions. The joint or connecting portion between each blade and its wing may be a curved fillet as here shown, or it may be angular; but the fillet is usually to be preferred as rendering the cutter less likely to remove some of the bitter rind with the pulp at the junction of a cell wall with the rind.

The blades proper are held parallel and slightly spaced apart by a spacing element 18 arranged between the upwardly projecting lugs or projections 18' of the blades. Through these lugs and the spacing element pass suitable fastening means such as rivets 19 or the like. The spacing element as here illustrated may conveniently be simply a flat terminal enlargement or lug of tang 20, which latter may be slightly bent or curved as here shown, and to which handle 21 is suitably secured. The arrangement of the handle substantially parallel to but well above the general longitudinal axis of the blades has special advantages for present purposes, although other arrangements of the handle are not excluded.

In using the cutter to loosen the pulp in a halved grape-fruit, for example, the cutter is best placed in a nearly vertical position, (Fig. 3) with its twin points close to the core 22 of the grape-fruit and with the blades vertically above and parallel to one of the walls 23 separating the cells 24 of the grape-fruit. The cutter is then pushed downwardly until the points reach the bottom of the fruit, or as far down as the laterally projecting wing blades will permit. In this movement, the parallel portions of the blades pass downwardly astride the cell wall and free the pulp to the desired depth from both sides of the cell wall simultaneously for a considerable distance from the core back toward the rind; while at the same time the blade points, working close to the core in the apices of the pair of adjacent and roughly triangular pulp cells, help to cut the pulp loose from the core. This action of the blade points is rendered particularly efficient by the slightly concave outline of the upper edge of the blade which insures a slight clearance between the fruit core and the blade edge during this movement of the cutter. The cutter is then moved radially outward until the edges of the rear cutting wings approximate the inner surface of the rind 25 of the fruit, this movement further separating the pulp from both sides of the radial cell wall. The handle is now turned downwardly out of vertical position, the cutter as a whole pivoting around a point intermediate its ends; whereupon the rear cutting wings move downwardly parallel and close to the rind to separate the pulp therefrom for a distance on both sides of the cell wall corresponding to the width of the cutting wings. At the same time the parallel blades also separate from the cell wall any pulp not cut away during the prior movements of the cutter. During this finishing movement, (Figs. 4 and 5) the blade points 14 rise; and in passing upwardly through the central portion of the fruit, they catch and eject a considerable number of seeds. The concave outline of the upper edge of the blades favors this ejecting action. These movements may be accomplished very rapidly and practically continuously. Obviously this order of procedure is subject to variation; but with the specific embodiment of the invention illustrated in the drawings, it gives good results. The cutter is now applied successively to the rest of the cell partitions in the same manner as above described until the complete circuit has been made. Where the cells are of normal size and where the cutter blades and wings are symmetrical in all respects relative to the cutter axis, it is apparent that the rear portion of the pulp in any given cell is separated from the rind in two stages, assuming the width of a cutter blade to be less than that of the outer end of the cell. Thus by reference to Fig. 5, it will be seen that wing 12 has cut approximately half the rear of the cell included between partitions 23 and 26 away from the rind; and that the remainder of the cut will be made by wing 13 when the cutter is moved to engage partition 26.

Obviously the wings may be constructed of different widths; or one wing could be omitted altogether, the remaining wing being made sufficiently wide to accomplish alone the entire transverse or rind cut for each cell. But the symmetrical arrangement of twin cutter blades and wings here illustrated I consider a particularly useful form of the invention. The blades may also be provided in different shapes and sizes for use with fruit of different sizes; and they may be detachably connected to the handle so as to be readily interchangeable.

In the embodiment of the invention here illustrated, each of the parallel blades is roughly triangular and is somewhat similar in shape to a sector of a circle, the blades being held together only in the vicinity of their adjacent upper rear corners, each such corner corresponding, in this instance, to the angle between a radius and the arc in such sector. By this arrangement the space between cutting blades 10 and 11 is left unobstructed, thus enabling the blades to pass freely astride a cell partition in the manner described.

Although very advantageous, this particular form of the cutting blades and the specific arrangement of means for holding them are not invariable. The essential point is that the parallel vertical plane cutting blades, of whatever shape, be so secured together in spaced relation that they can be pushed down astride a cell partition and close to the opposite sides thereof without any obstruction being encountered between the blades. The unsymmetrical or offset location of the spacing member and handle relative to the blades renders the illustrated embodiment of the invention especially suited for the purpose specified, since the blades can be pushed down to the proper depth without any interference on the part of either the spacing member or handle.

It is evident that many other alterations in the specific form and arrangement of the cutter parts may be made without going beyond the limits of the broad invention herein disclosed. It is to be understood that the specific embodiment shown in the drawings is merely illustrative and that the invention is by no means limited to this particular structure. Thus the blade wings may be tapered downwardly if desired, instead of being of uniform width; the handle may be differently located; the cutter may be arranged to sever the pulp to a greater or less depth than here shown below the cut face of the halved fruit; and the cutter parts may be so arranged as to render it more convenient to begin the cutting operation at the outer ends of the cells than at the core ends. These and other changes of similar nature whereby the mechanical details of the device are varied more or less while still retaining the advantages of the present structure are all included within the scope of the present invention.

What I claim is:

1. A fruit cutter comprising a pair of blades, and means located near the upper edges of said blades and toward the rear thereof for holding said blades parallel and spaced apart, the space between the blades being substantially unobstructed, in combination with a blade arranged transversely to such parallel blades and coöperating therewith.

2. A fruit cutter comprising a pair of blades mounted in parallel with their faces slightly spaced apart, in combination with a pair of blades arranged transversely to such parallel blades and coöperating therewith.

3. A fruit cutter comprising a pair of blades mounted in parallel and suitably spaced apart, in combination with blades connected, respectively, to such parallel blades and extending outwardly in substantially opposite directions therefrom.

4. A fruit cutter comprising a pair of blades mounted in parallel and suitably spaced apart, in combination with cutting wings integral with such parallel blades and extending outwardly in substantially opposite directions therefrom.

5. A fruit cutter comprising the combination with a pair of cutting blades and means engaging said blades near one pair only of their adjacent ends and above the longitudinal axis of said blades for maintaining the blades in spaced parallel arrangement, the space between the blades being substantially unobstructed, of a blade arranged to operate near a pair of the adjacent ends of the parallel blades and transversely thereto.

6. A fruit cutter comprising the combination with a pair of cutting blades and means engaging said blades near their rear ends only for maintaining the blades in spaced parallel arrangement, of blades connected, respectively, to such parallel blades near their rear ends and extending laterally therefrom in opposite directions.

7. A fruit cutter comprising the combination with a pair of blades mounted in parallel and suitably spaced apart, each blade having a curved lower cutting edge and a rear portion making an angle with the cutting edge, of members projecting laterally from the rear portions of said blades and on the non-adjacent sides thereof, each said member having lower cutting edge coöperating with the cutting edge of the blade from which such member projects.

8. A fruit cutter comprising the combination with a pair of blades mounted in parallel and suitably spaced apart, each blade having a curved lower cutting edge and a curved rear portion, of lateral cutting wings integral with said blades and extending divergently one from the rear portion of each blade.

9. A fruit cutter comprising the combination with a pair of blades mounted in parallel and suitably spaced apart, each blade having a curved lower cutting edge and a curved rear portion, of lateral cutting wings integral with said blades and extending divergently one from the rear portion of each blade, and a handle suitably secured to said blades.

10. A fruit cutter comprising, in combination, a pair of blades each having a pointed forward end, a lower cutting edge and a laterally projecting cutting wing or extension at the rear, and means engaging the rear portion of said blades for holding the blades substantially parallel and somewhat spaced apart with the cutting wings divergent.

11. A fruit cutter comprising, in combination, a pair of blades each having a pointed forward end, a lower cutting edge and a laterally projecting cutting wing or extension at the rear, means engaging the rear portion of said blades for holding the blades substantially parallel and somewhat spaced apart with the cutting wings divergent, and a handle secured to said blades adjacent their rear portions.

12. A fruit cutter comprising, in combination, a pair of blades each having a pointed forward end, a lower cutting edge, a curved rear portion and a cutting wing or extension projecting laterally from such rear portion, means engaging the rear portions of said blades whereby the blades are held parallel and slightly spaced apart, a tang connected to both blades, and a handle mounted on said tang.

13. A device for loosening the pulp in halved grape fruit and the like which comprises a pair of cutting members rigidly connected and spaced apart, said members being parallel for the greater part of their length but diverging near one end of the device.

14. A cutting device comprising a pair of blades having their major portions plane and provided with lower cutting edges, means for holding said blades parallel and slightly spaced apart with substantially the entire space between the blades unobstructed, and oppositely diverging extensions with lower cutting edges arranged near one pair of adjacent ends of said blades.

15. A cutting device comprising a pair of plane blades with lower cutting edges, means for holding said blades vertical and parallel with their adjacent faces slightly spaced apart, such holding and spacing means engaging said blades only at their upper edges and near the rear thereof, and transverse cutting wings extending laterally from said blades at the rear and provided with lower cutting edges continuous with the lower cutting edges of the parallel blades.

16. A fruit cutter comprising two plane blades each pointed at the front and relatively broad at the rear, the rear end being curved in the plane of the blade and each blade having a curved lower cutting edge, means for holding said blades parallel and slightly spaced apart, said means engaging only the upper rear portion of each blade, leaving the space between the blades substantially unobstructed, and divergent transverse wings or cutting members extending laterally, one from the rear of each blade, each such wing having a lower cutting edge and being curved to conform with the curvature of the rear ends of the blades.

17. In a device of the character described, a cutting member comprising a plane blade pointed at one end and curved at the opposite end, and a wing or extension of said blade extending laterally therefrom, said wing being curved in a direction parallel to the curved end of said blade.

In testimony whereof, I affix my signature in the presence of two subscribing witnesses.

CHESTER S. MERRILL.

Witnesses:
EDWARD P. DOLE,
GLEN S. CORKERY.